United States Patent
Hase et al.

(10) Patent No.: US 9,695,270 B2
(45) Date of Patent: Jul. 4, 2017

(54) PHOTOCURABLE MATERIAL COMBINING RADICAL CURABILITY AND ANIONIC CURABILITY

(71) Applicants: AUTONETWORKS TECHNOLOGIES, LTD, Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP); KYUSHU UNIVERSITY, Fukuoka-shi, Fukuoka (JP)

(72) Inventors: Tatsuya Hase, Yokkaichi (JP); Kazuo Nakashima, Yokkaichi (JP); Makoto Mizoguchi, Fukuoka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); KYUSHU UNIVERSITY, Fukuoka (JP)

(*) Notice: Subject to any disclaimer, the term of this patent is extended or adjusted under 35 U.S.C. 154(b) by 41 days.

(21) Appl. No.: 14/767,703

(22) PCT Filed: Aug. 9, 2013

(86) PCT No.: PCT/JP2013/071652
§ 371 (c)(1),
(2) Date: Aug. 13, 2015

(87) PCT Pub. No.: WO2014/132464
PCT Pub. Date: Sep. 4, 2014

(65) Prior Publication Data
US 2016/0002388 A1 Jan. 7, 2016

(30) Foreign Application Priority Data
Feb. 27, 2013 (JP) ................................ 2013-037321

(51) Int. Cl.
C08G 18/83 (2006.01)
C08F 2/38 (2006.01)
C08F 2/50 (2006.01)

(52) U.S. Cl.
CPC .............. *C08G 18/831* (2013.01); *C08F 2/38* (2013.01); *C08F 2/50* (2013.01); *C08G 18/837* (2013.01)

(58) Field of Classification Search
CPC ... C08F 2/38; C08F 2/50; C08F 20/06; C08G 18/837; C08L 33/08; C08L 33/10; C08L 33/12
(Continued)

(56) References Cited

U.S. PATENT DOCUMENTS 4,543,404 A * 9/1985 Sugano ............. B32B 17/10688
522/90
4,849,462 A * 7/1989 Bishop ................. C03C 25/106
385/128
(Continued)

FOREIGN PATENT DOCUMENTS

CN 1684919 A 10/2005
EP 2 514 781 A1 10/2012
(Continued)

OTHER PUBLICATIONS

Tyzor. Dorf Ketal. Tyzor TnBT Organic Titanate. Dorf Ketal Chemicals PVT, Ltd. Evidentiary Reference. Available at www.dorfketal.com. Jul. 14, 2010.*
(Continued)

*Primary Examiner* — Mike M Dollinger
(74) *Attorney, Agent, or Firm* — Oliff PLC

(57) ABSTRACT

A photocurable material that allows dark portion curing even if the form of a material to be cured is complicated and the length of an unirradiated portion is long. The photocurable material has both of radical curability and anionic curability, is a photocurable liquid composition curable by irradiation of light, and contains (meth)acrylate and a chain transfer agent, wherein the chain transfer agent is a compound containing one or more of at least one kind selected from a urethane bond, a urea bond, and an isocyanate group, and (Continued)

one or more alkoxysilyl groups. The photocurable material is capable of curing even a portion that irradiation light does not reach.

8 Claims, 1 Drawing Sheet

(58) Field of Classification Search
 USPC ........................................................ 525/454
 See application file for complete search history.

(56) References Cited

U.S. PATENT DOCUMENTS

| | | | |
|---|---|---|---|
| 5,312,943 A * | 5/1994 | Gaglani | C07F 7/1836 |
| | | | 522/172 |
| 5,523,443 A | 6/1996 | Gaglani | |
| 2003/0060536 A1 | 3/2003 | Spange et al. | |
| 2006/0205868 A1 * | 9/2006 | Gordon | C08G 18/61 |
| | | | 524/588 |
| 2007/0263972 A1 | 11/2007 | Roba et al. | |
| 2010/0233595 A1 * | 9/2010 | Takahashi | C08F 2/38 |
| | | | 430/7 |
| 2012/0232183 A1 * | 9/2012 | Ooga | H05K 3/287 |
| | | | 522/144 |
| 2013/0338327 A1 | 12/2013 | Hase et al. | |

FOREIGN PATENT DOCUMENTS

| | | | |
|---|---|---|---|
| JP | S62-119216 A | 5/1987 | |
| JP | 2001131243 A | 5/2001 | |
| JP | 2003-055126 A | 2/2003 | |
| JP | 2012-251034 A | 12/2012 | |
| JP | 2014162892 A * | 9/2014 | ............... C08F 2/38 |
| WO | 94/09013 A1 | 4/1994 | |
| WO | 2011/074503 A1 | 6/2011 | |
| WO | 2012/090298 A1 | 7/2012 | |
| WO | 2012/102299 A1 | 8/2012 | |

OTHER PUBLICATIONS

Vertellus. Smart Chemistry. Cotin 200. 2016 Vertellus Holdings LLC. Evidentiary Refernce. Available at www.vertellus.com.*
Mar. 22, 2016 Office Action issued in Chinese Patent Application No. 201380072832.8.
May 10, 2016 Office Action issued in Japanese Patent Application No. 2013-037321.
May 10, 2016 Office Action issued in Korean Patent Application No. 1020157021531.
Jun. 24, 2016 European Search Report issued in European Patent Application No. 13876538.3.
Oct. 15, 2013 International Search Report issued in Application No. PCT/JP2013/071652.
Sep. 6, 2016 Office Action issued in Japanese Patent Application No. 2013-037321.

* cited by examiner

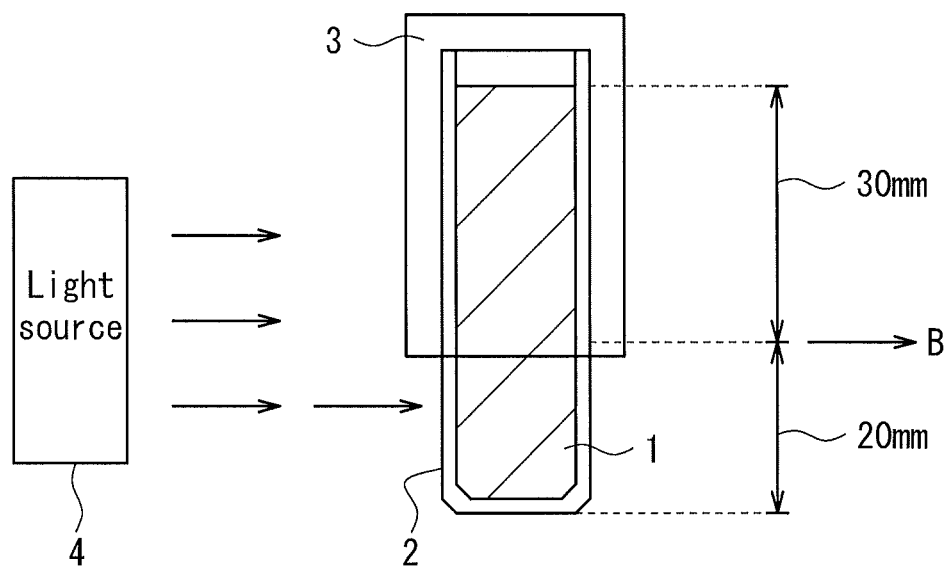

PHOTOCURABLE MATERIAL COMBINING RADICAL CURABILITY AND ANIONIC CURABILITY

TECHNICAL FIELD

The present invention relates to a photocurable material combining radical curability and anionic curability, and more specifically relates to a photocurable material used for an adhesive material, a coating material, a sealing material, and a molding material for car parts, parts for electric/electronic appliance, and aircraft parts.

BACKGROUND ART

Bonding, coating, and shielding processes are important in the material processing or molding, and a variety of materials are used for the material. Especially from the aspect of workability, materials having the properties capable of being added and coated at ambient temperatures and then cured by some action have been long used.

Most adhesives and paints are generally used such that pigments or resins are dissolved in an organic solvent or water to be coated on target materials in the form of liquid and then the organic solvent or water is evaporated to obtain cured products. However, using an organic solvent causes a problem of negative health effects or inflammability due to evaporated gas, and using water causes a problem of taking time in order to obtain a cured product due to the low volatility of water.

Among those materials, a photocurable material can cure a liquid composition only by irradiation of light, and is thus used as a useful material. In general, only a portion that is irradiated with light can be cured in the photocurable material, so that it is difficult to cure a portion that the light is hard to reach. Thus, a variety of chain transfer agents are used as additives in order to cure a portion at a certain distance (a dark portion) from the irradiation portion (e.g., see Patent Literature 1).

CITATION LIST

Patent Literature

Patent Literature 1: JP 2012-251034 A

SUMMARY OF INVENTION

Problem that the Invention is to Solve

The ultraviolet-curable composition disclosed in the above patent Literature 1 defines a combination of an ultraviolet-curable material containing (meth)acrylate and a photopolymerization initiator, and a chain transfer agent. For example, the above-described chain transfer agent contains (meth)acrylate and a metal-containing compound, the (meth)acrylate being obtained by reacting 400 molecular weight of polypropylene glycol with an excessive mole number of hexamethylene diisocyanate to further react the remaining isocyanate groups to have (meth)acrylate having a terminal acrylate groups (see Examples in Patent Literature 1).

However, while the above-described photocurable material has dark portion curability, if the form of the material to be cured is complicated and the length of the unirradiated portion is long, there arises a problem in that the dark portion curing by the above-described chain transfer agent is insufficient.

The present invention is made in view of the problem described above, and an object of the present invention is to provide a photocurable material capable of curing a dark portion even if the form of a material to be cured is complicated and the length of an unirradiated portion is long.

Solution to Problem

To achieve the objects and in accordance with the purpose of the present invention, the photocurable material according to the present invention is a photocurable liquid composition curable by irradiation of light, the material containing (meth)acrylate and a chain transfer agent, wherein the chain transfer agent is a compound containing one or more of at least one kind selected from a urethane bond, a urea bond, and an isocyanate group, and one or more alkoxysilyl groups.

It is preferable that the photocurable material should further contain a metal-containing compound.

It is preferable that in the photocurable material, the content of the chain transfer agent should be within the range of 10 to 90 mass % of the total photocurable material.

It is preferable that in the photocurable material, the metal-containing compound should be any one metal compound selected from tin, copper, zinc, cobalt, and nickel.

Advantageous Effects of Invention

Because the photocurable material according to the present invention is a photocurable liquid composition curable by irradiation of light that contains (meth)acrylate and a chain transfer agent, wherein the chain transfer agent is a compound containing one or more of at least one kind selected from a urethane bond, a urea bond, and an isocyanate group, and one or more alkoxysilyl groups, the photocurable material combines both radical curability and anionic curability, is capable of curing even a portion that irradiation light does not reach, and allows dark portion curing even if the form of a material to be cured is complicated and the length of an unirradiated portion is long.

BRIEF DESCRIPTION OF THE DRAWINGS

FIG. 1 is an explanatory view showing a test method of dark portion curability in Examples of the present invention.

MODE FOR CARRYING OUT THE INVENTION

Hereinafter, a detailed explanation of Examples according to the present invention will be provided. The photocurable material according to the present invention contains a liquid composition having both of radical curability, which is curability of curing a material with irradiation of light such as ultraviolet light where radical relates, and anionic curability, which is curability of curing a material with irradiation of light such as ultraviolet light where anion relates. The photocurable material contains at least a (meth)acrylate ingredient and a chain transfer agent ingredient. It is to be noted that light to be used for curing the photocurable material in the present invention includes visible light and infrared light in addition to ultraviolet light. In addition, a liquid form of the photocurable material means having a flow property at ambient temperatures. The viscosity of the curable material is preferably within the range of 0.01 to 50 Pa·s from the viewpoint of having a favorable flow property. In addition, (meth)acrylate means containing both acrylate and methacrylate in the present invention.

The principles of curing of a general ultraviolet curable resin is such that a photopolymerization initiator absorbs ultraviolet (ultraviolet light) to generate activated species such as radical species, and the activated species radical-polymerize carbon-to-carbon double bonds such as (meth)acrylate to perform curing. However, in general ultraviolet curing, an ultraviolet curable resin has an uncured portion where ultraviolet light is shielded. Meanwhile, adding a chain transfer agent to the curing material can provide the curing materials with dark portion curability such that the radicals generated by the irradiation of ultraviolet light can be transferred to a site where the ultraviolet light is shielded and there is no radical generation, and a polymerization reaction is initiated to proceed there, allowing the dark portion (referred to also as a deep portion) where the ultraviolet light is shielded to be cured.

A major feature of the present invention is using a compound containing one or more of at least one kind selected from a urethane bond, a urea bond, and an isocyanate group, and one or more alkoxysilyl groups. Conventionally, a compound containing one or more of a urethane bond, a urea bond, and an isocyanate group is used as a chain transfer agent as described in the above-described Patent Literature 1. In the present invention, an alkoxysilyl group is further introduced into a part of the compound containing one or more of a urethane bond, a urea bond, and an isocyanate group, the compound being a component of the chain transfer agent.

In general, an alkoxysilyl group is used as a reactive group for curing a humidity curable material in the presence of catalyst. However, an alkoxysilyl group is hydrolyzed by water in the air to be dealcoholized to generate a silanol group, and then a dehydrating condensation reaction further proceeds. Hydrolysis is a reaction depending on humidity or the like in the atmosphere, so that the curing rate of a humidity curable material is slow in general.

Meanwhile, it is known that polyalcohol having a hydroxyl group that becomes a kind of anion is generated as a by-product in the above-described photocuring reaction using the above-described chain transfer agent. It is found that when an alkoxysilyl group is introduced into a part of the chain transfer agent, an ester exchange reaction occurs between the alkoxysilyl group and the polyalcohol, which is a by-product generated in the photocuring reaction of the chain transfer agent, and curing is immediately performed before the alkoxysilyl group reacts with water in the air.

This curing reaction can be called anion curing because curing is performed via the anion (hydroxyl group) generated as a by-product. To be specific, using the chain transfer agent containing one or more of at least one kind selected from a urethane bond, a urea bond, and an isocyanate group, and one or more alkoxysilyl groups in the above-described one molecule makes radical curing and anion curing occur simultaneously, which allows a dark portion of a longer length to be cured.

The above-described chain transfer agent can be obtained by the following method, for example. First, an active hydrogen-containing compound such as polyol and polyamine is reacted with polyisocyanate to form a urethane bond portion or a urea bond portion. In this reaction, it is also possible to adjust the proportion of the isocyanate group and the active hydrogen-containing compound to synthesize them as a polymer depending on conditions. In this reaction process, an isocyanate intermediate having a residual isocyanate group at its terminal is generated. Further, this intermediate is reacted with an organic silane compound having an functional group such as an amino group and a hydroxyl group and an alkoxy silyl group at its terminals (e.g., a silane coupling agent), and thereby a chain transfer agent of which a terminal is modified with an alkoxy silyl group can be synthesized.

An example of the chain transfer agent thus obtained is represented by the following Chemical Formula 1. The chain transfer agent represented by Chemical Formula 1 is obtained by reacting polyoxyalkylene diol with diisocyanate to produce an intermediate having isocyanate groups at its terminals, and then reacting the isocyanate groups at the terminals of the intermediate with the amino group of a silane coupling agent having an amino group and an alkoxy silyl group.

[Chemical 1]

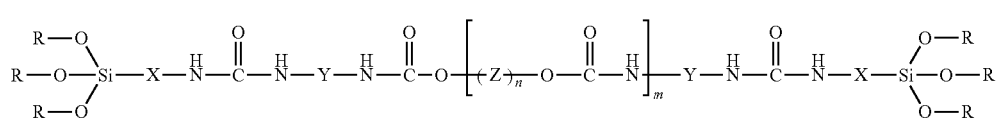

For example, in the above Chemical Formula 1, R represents an alkyl group such as $CH_3$ and $C_2H_5$. X represents a divalent hydrocarbon group such as $C_2H_4$, $C_3H_6$, and $C_4H_8$. Y represents a linear divalent hydrocarbon group such as $C_4H_8$ and $C_6H_{12}$, a saturated cyclic divalent hydrocarbon group such as cyclohexyl, dicyclohexyl, isophoronyl, and norbornyl, or an unsaturated cyclic divalent hydrocarbon group such as tolylene, xylylene, naphthalene, and diphenylmethane. Z represents a repeating unit of a diol component such as polyoxypropylene glycol, polyoxyethylene glycol, and polytetramethylene ether, and n is about 5 to 100 and m is about 2 to 100.

In addition, in reacting the above-described isocyanate intermediate with the silane compound, reacting to modify the isocyanate intermediate with both of hydroxyalkyl (meth)acrylates and a silane compound having an amino group and an alkoxysilyl group can synthesize a chain transfer agent into which both of a photoreactive acryloyl group (or a methacryloyl group) and an anion reactive alkoxysilyl group are introduced.

Irradiating a photocurable material containing the chain transfer agent synthesized in the above-described method as a composition with light such as ultraviolet light generates a hydroxyl group accompanied by cleavage of an ester bond portion of the (meth)acrylate in parallel with the proceeding of radical polymerization of a double bond portion of the acryloyl group of the (meth)acrylate. This is based on the presumption that if an ether bond exists in the ester bond of the (meth)acrylate or the polyol in the chain transfer agent when the composition containing the chain transfer agent receives ultraviolet irradiation and the (meth)acrylate radical-reacts, this ether bond also cleaves to generate hydroxy radical to generate a hydroxyl group as a by-product or a product after deactivation of the hydroxy radical.

As described above, generation of a hydroxyl group is accompanied by cleavage of the (meth)acrylate. One hydroxyl group of the molecules has been already taken in polymer in the photo-radical reaction while the other hydroxyl group could further form a bond with an alkoxysilyl group in an ester exchange reaction, so that a condensation reaction occurs after the above-described photo-radical reaction.

The above-described condensation reaction is caused also by humidity in the air; however, because generation of the above-described polymerizable hydroxyl group is accompanied in this reaction system, the condensation of the alkoxysilyl group is promoted. It is assumed that this reaction proceeds in the following mechanism. The following Chemical Formula 2 represents a process where one hydroxyl group of the molecules has been already taken in polymer in the photo-radical reaction while the other hydroxyl group and the alkoxysilyl group are being polymerized by the ester exchange reaction. The following Chemical Formula 3 represents a process where a molecule having two or more hydroxyl groups is generated in the photo-radical reaction and the polymerization proceeds via the hydroxyl groups at both the terminals. It is assumed that a reaction represented by Chemical Formula 2 or Chemical Formula 3 proceeds, or both of the reactions proceed in parallel depending on a used chain transfer agent, which shows that polymerization proceeds by the reaction of the alkoxysilyl group and the hydroxyl group in which an ester exchange reaction is likely to occur in both of the reactions by Chemical Formula 2 and by Chemical Formula 3. In addition, these reactions define a one-step reaction for an ester exchange reaction.

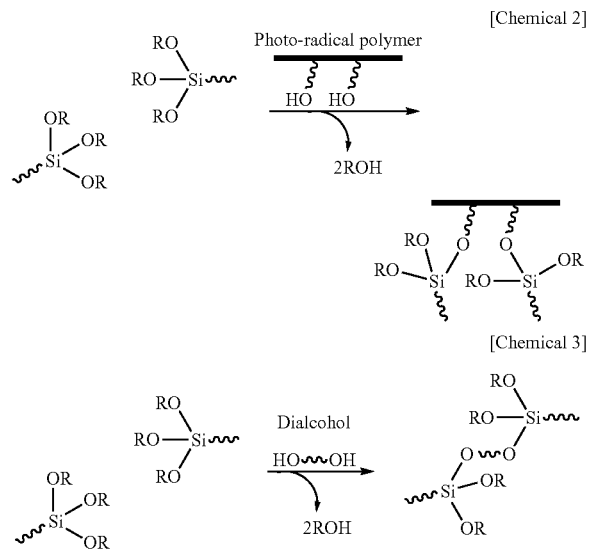

[Chemical 2]
[Chemical 3]

Meanwhile, a curing reaction by humidity is a two-step reaction because the alkoxysilyl group once hydrolyzes to then perform an ester exchange reaction with the generated silanol group as shown in Chemical Formula 4. Thus, it can be said that the above-described reaction via the hydroxyl group is a faster reaction.

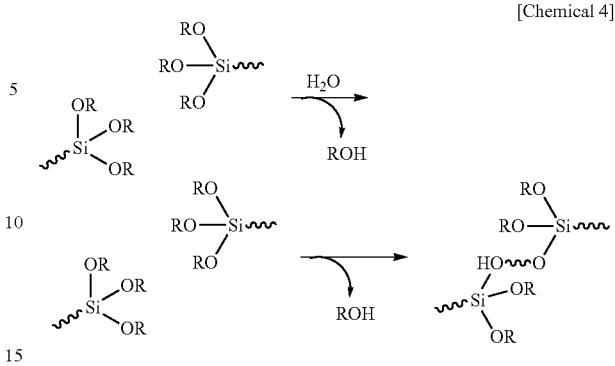

[Chemical 4]

The hydroxyl group is a kind of anion, so that it can be said that this reaction system is a kind of anion polymerization. In addition, this reaction is different from a radical chain reaction, and is caused by diffusion of generated anion molecules. Thus, while the reaction rate of this curing reaction is slower than the photo-radical reaction, longer distance transfer is possible, which allows a curing reaction of a dark-portion of a longer length.

To be specific, by using the chain transfer agent containing an alkoxysilyl group in molecules, both effects of photo-radical curing and later anion curing can be achieved by the above-described effect. Thus, it is found that curing of a dark portion that light cannot reach in the conventional chain photo-radical reaction can be complemented by the later anion curing.

Descriptions of specific examples of the chain transfer agent will be provided. Examples of the isocyanate compound used in the formation of the chain transfer agent include monoisocyanate, diisocyanate, and polyisocyanate having three or more functional groups. Examples of the above-described monoisocyanate include stearyl isocyanate and the like. Examples of the above-described diisocyanate include aliphatic isocyanate such as methylene diisocyanate, ethylene diisocyanate, tetramethylene diisocyanate, hexamethylene diisocyanate (HDI), dodecamethylene diisocyanate, 2,2,4-trimethyl hexamethylene diisocyanate, lysine diisocyanate (LDI), and 1,3,6-hexamethylene triisocyanate, aliphatic isocyanate such as hydrogenated-4,4'-diphenylmethane diisocyanate (hydrogenated MDI), hydrogenated-xylylenediisocyanate (hydrogenated XDI), 1,4-cyclohexane diisocyanate, hydrogenated-2,4'tolylene diisocyanate (hydrogenated TDI), isophorone diisocyanate (IPDI), and norbornene diisocyanate (NBDI), araliphatic isocyanate such as xylylenediisocyanate (XDI) and tetramethyl xylylenediisocyanate (TMXDI), 1,4-diphenyl diisocyanate, 2,4 or 2,6-trilenediisocyanate (TDI), 2,4 or 4,4-diphenylmethane diisocyanate (MDI), 1,5-naphthalene diisocyanate (NDI), 3,3'-dimethyl-4,4'-diphenylmethane diisocyanate, and O-tolidine diisocyanate. In addition, examples of polyisocyanate having more than two functional groups include aromatic isocyanate such as polyphenylmethane polyisocyanate (crude MDI), triphenylmethane triisocyanate, and tris (isocyanatophenyl) thiophosphate.

Examples of the above-described isocyanate compound include biuret type polyisocyanate that is obtained by further reacting the above-described polyisocyanate with water, an adduct-type polyisocyanate that is obtained by reacting the above-described polyisocyanate with polyalcohol such as trimethylolpropane, and multimer that is obtained by isocyanurating the above-described polyisocyanate. As the isocyanate compound, the above-described compound may be used alone, or two or more kinds may be used in combination.

Examples of the hydroxyl group-containing compound that reacts with the above-described isocyanate compound to forma urethane bond include alcohols having hydroxy groups at their terminals and having a chain of 1 to 30 carbon atoms, diol-terminated (poly)ethylene glycol, diol-terminated (poly)propylene glycol, diol-terminated (poly)hexamethylene glycol, diol-terminated (poly)caprolactone, diol-terminated (poly) ester (poly)ol, diol-terminated (poly) amido, and diol-terminated (poly) ester.

Examples of the amine-containing compound that reacts with the above-described isocyanate compound to form a urea bond include amines having primary or secondary amino groups at their terminals and having a chain of 1 to 30 carbon atoms, diamine-terminated (poly)ethylene glycol, diamine-terminated (poly)propylene glycol, diamine-terminated (poly)hexamethylene glycol, diamine-terminated (poly)caprolactone, diamine-terminated (poly)ester (poly)ol, diamine-terminated (poly)amido, and diamine-terminated (poly)ester.

Examples of the silane compound having an alkoxysilyl group and an amino group that is reacted with the above-described isocyanate group include 3-aminopropyltrimethoxysilane, 3-aminopropyltriethoxysilane, 3-(2-aminoethyl)aminopropyltrimethoxysilane, and 3-phenylaminopropyltrimethoxysilane.

In addition, examples of the organic silane compound having an alkoxysilyl group and a hydroxyl group include 3-hydroxypropyltrimethoxysilane and 3-hydroxypropyltriethoxysilane.

Examples of the hydroxyalkyl (meth)acrylate that is reacted with the above-described isocyanate group include 2-hydroxyethyl acrylate, 2-hydroxypropyl acrylate, 2-hydroxybutyl acrylate, 4-hydroxybutyl acrylate, 1,4-cyclohexane dimethanol monoacrylate, 2-hydroxy-3-phenoxypropyl acrylate, 2-hydroxyethyl methacrylate, 2-hydroxypropyl methacrylate, and 2-hydroxybutyl methacrylate.

Examples of the hydroxyalkyl (meth)acrylate include monoacrylate having one acryloyl group and a hydroxyl group in one molecule, diacrylate having two acryloyl groups and a hydroxyl group in one molecule, or polyacrylate having three or more acryloyl groups and a hydroxyl group in one molecule.

The alkyl group of the hydroxyalkyl (meth)acrylate may be a linear or cyclic alkyl chain having 1 to 10 carbon atoms that may have an unsaturated bond, and may have a substituent group, an ether bond, and a thioether bond.

In the photocurable material, the content of the above-described chain transfer agent is preferably within the range of 10 to 90 mass % of the total photocurable material. When the content is within this range, the physical properties before and after curing is made stable, and thereby a sufficient chain transfer effect can be obtained.

The (meth)acrylate used in the photocurable material is not limited specifically if the (meth)acrylate is a compound having one or more (meth)acrylate group in molecules, and conventionally known (meth)acrylate can be used. Specific examples of the above-described (meth)acrylate include mono(meth)acrylate such as isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, (meth)acrylic acid, benzyl (meth)acrylate, 4-butylcyclohexyl (meth)acrylate, (meth)acryloyl morpholine, 2-hydroxyethyl (meth)acrylate, 2-hydroxypropyl (meth)acrylate, 4-hydroxybutyl (meth)acrylate, methyl (meth)acrylate, ethyl (meth)acrylate, propyl (meth)acrylate, isopropyl (meth)acrylate, octyl (meth)acrylate, isooctyl(meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth)acrylate, tetrahydrofurfutyl (meth)acrylate, polyethylene glycol mono (meth)acrylate, polypropylene glycol mono(meth)acrylate, methoxy ethylene glycol (meth)acrylate, ethoxyethyl (meth)acrylate, methoxy polyethylene glycol (meth)acrylate, methoxy polypropylene glycol (meth)acrylate, polyoxyethylene nonyl phenyl ether acrylate, diacetone (meth)acrylamide, isobutoxymethyl (meth)acrylamide, N, N-dimethyl (meth)acrylamide, t-octyl (meth)acrylamide, dimethylaminoethyl (meth)acrylate, diethylaminoethyl (meth)acrylate, 7-amino-3,7-dimethyl octyl (meth)acrylate, N, N-diethyl (meth)acrylamide, and N, N-dimethylaminopropyl (meth)acrylamide, poly(meth)acrylate such as butane diol di(meth)acrylate, hexanediol di(meth)acrylate, nonanediol di(meth)acrylate, decane diol di(meth)acrylate, 2-butyl-2-ethyl-1,3-propanediol di(meth)acrylate, 2-hydroxy-3-acryloyloxypropyl methacrylate, dipropylene glycol di(meth)acrylate, tripropylene glycol di(meth)acrylate, triethylene glycol di(meth)acrylate, tetraethylene glycol di(meth)acrylate, tricyclodecanedimethylol di(meth)acrylate, 1,4-butane polyol di(meth)acrylate, 1,6-hexane polyol di(meth)acrylate, neopentyl glycol di(meth) acrylate, polyethylene glycol di(meth)acrylate, polypropylene glycol di(meth)acrylate, 9,9-bis[4-(2-acryloyloxyethoxy)phenyl]fluorene, polyester di(meth) acrylate, tris(2-hydroxyethyl) isocyanurate tri(meth) acrylate, tris(2-hydroxyethyl) isocyanurate di(meth) acrylate, tricyclodecanedimethylol di(meth)acrylate, bisphenol A-EO adduct di(meth)acrylate, di(meth)acrylate of hydrogenerated bisphenol A-EO adduct or PO adduct polyol, di(meth)acrylate of hydrogenated bisphenol A-EO adduct or PO adduct, epoxy (meth)acrylate obtained by addition of (meth)acrylate to diglycidylether of bisphenol A, triethylene glycol divinyl ether, trimethylolpropane tri (meth)acrylate, pentaerythritol tri(meth)acrylate, trimethylolpropane-EO adduct tri(meth)acrylate, tris-acryloyloxyethyl phosphate, pentaerythritol tetra(meth)acrylate, tetrafurfuryl alcohol oligo(meth)acrylate, ethyl carbitol oligo(meth)acrylate, 1,4-butanediol oligo(meth)acrylate, 1,6-hexanediol oligo(meth)acrylate, trimethylolpropane oligo (meth)acrylate, pentaerythritol oligo(meth)acrylate, pentaerythritol oligo (meth)acrylate, (poly)urethane (meth) acrylate, and (poly)butadiene (meth)acrylate. These (meth) acrylates may be used alone, or two or more kinds may be used in combination. The (meth)acrylate can be appropriately selected depending on the intended use of the photocurable material.

It is preferable that the photocurable material should further contain a metal-containing compound and a photopolymerization initiator in addition to the above-described ingredients.

One or more kinds of metals selected from metal species of tin, copper, zinc, cobalt, and nickel are used as the above-described metal-containing compound. The above-described metal-containing compound is not specifically limited as long as the above-described one or more kinds of metals are contained in the constituent molecules in the form of metal salt or complex, and conventionally known metal compounds can be used.

The content of the above-described metal compound is preferably 0.0005 mass % or more of the total photocurable material from the viewpoint of obtaining favorable dark portion curability.

A metal compound in the form of metal salt such as organic acid salt or of metal complex is preferably used as the above-described metal compound from the viewpoints of easy mixing with the curable material and preventing precipitation during storage.

Examples of the metal salt of the above-described metal compound include a carboxylate salt, phosphoric salt, a salt of sulphonic acid, a hydrochloride salt, a bromate salt, and chlorate (perchloric) (acid chlorite) of the above-described metal species.

The metal complex of the above-described metal compound is not specifically limited as long as coordinated to be stabilized with organic ligands that can be coordination bond-formed with the above-described metal species at 1:1 to 1:4 (metal:ligand), and conventionally known metal complex can be used.

Specific examples of the above-described metal-containing compound include bis(2,4-pentanedionato)tin, dibutyltin bis(trifluoromethanesulfonate), dibutyltin diacetate, dibutyltin dilaurate, dibutyltin maleate, phthalocyaninetin (IV) dichloride, tetrabutylammonium difluorotriphenyltin, phthalocyaninetin (II), tributyl (2-pyridyl)tin, tributyl(2-thienyl)tin, tributyltin acetate, tributyl(trimethylsilyl ethynyl)tin, trimethyl(2-pyridyl)tin, bis(hexafluoroacetylacetonato)copper (II), bis(2,4-pentanedionato)copper(II), bis(1,3-propanediamine)copper(II) dichloride, bis(8-quinolinolato) copper (II), bis(trifluoro-2,4-pentanedionato)copper(II), bis(2-hydroxyethyl) dithiocarbamate copper (II), diethyl dithiocarbamate copper, dimethyl dithiocarbamate copper (II), ethylenediaminetetraacetic acid copper(II) disodium salt, copper phthalocyanine (II), dichloro(1,10-phenanthroline) copper(II), copper phthalocyanine, tetra-4-tert-butyl phthalocyanine copper, tetrakis(acetonitrile)copper(I) hexafluorophosphate, copper naphthenate, bis[2-(2-benzothiazolyl) phenolato]zinc(II), bis[2-(2-benzoxazolyl)phenolato]zinc (II), bis(2-hydroxyethyl) dithiocarbamate zinc (II), bis(2,4-pentanedionato)zinc(II), bis(8-quinolinolato)zinc(II), bis (tetrabutylammonium) bis(1,3-dithiol-2-thione-4,5-dithiolate) zinc complex, ethylenediaminetetraacetic acid disodium zinc, dibenzyldithiocarbamic acid zinc(II), dibutyldithiocarbamic acid zinc (II), diethyldithiocarbamic acid zinc, dimethyldithiocarbamic acid zinc, zinc phthalocyanine, zinc naphthenate, bis(cyclopentadienyl)cobalt(III) hexafluorophosphate, [1,1'-bis(diphenylphosphino) ferrocene] cobalt(II) dichloride, bis(hexafluoroacetylacetonato) cobalt(II), (1R,2R)—N,N'-bis[3-oxo-2-(2,4,6-trimethylbenzoyl) butylidene]-1,2-diphenylethylenediaminato cobalt(II), (1S,2S)—N,N'-bis[3-oxo-2-(2,4,6-trimethylbenzoyl) butylidene]-1,2-diphenylethylenediaminato cobalt (II), bis(2,4-pentanedionato) cobalt (II), bis(trifluoro-2,4-pentanedionato)cobalt(II), phthalocyanine cobalt (II), ethylenediaminetetraacetic acid disodium cobalt, hexaamminecobalt(III) chloride, N,N'-disalicylal ethylene diamino cobalt(II), [5,10,15,20-tetrakis(4-methoxyphenyl)porphyrinato] cobalt(II), tris(2,4-pentanedionate)cobalt(III), cobalt naphthenate, [1,2-bis(diphenylphosphino)ethane] nickel(II) dichloride, bis(dithiobenzyl)nickel(II), bis(hexafluoroacetylacetonato)nickel(II), bis(2,4-pentanedionato)nickel(II), bis (tetrabutylammonium) bis(maleonitriledithiolato) nickel (II) complex, bis(tricyclohexylphosphine)nickel(II) dichloride, bis(triphenylphosphine)nickel(ii) dichloride, bromo[(2,6-pyridine-diyl)bis(3-methyl-1-imidazolyl-2-ylidene)]nickel bromide, ethylenediaminetetraacetic acid disodium nickel (II), dibutyldithiocarbamic acid nickel(II), and diethyldithiocarbamic acid nickel. These metal-containing compounds may be used alone, or two or more kinds may be used in combination.

The photopolymerization initiator added to the photocurable material is not limited specifically if the photopolymerization initiator is a compound that absorbs ultraviolet light to initiate radical polymerization, and conventionally known photopolymerization initiator can be used.

Specific examples of the photopolymerization initiator include 1-hydroxycyclohexyl phenyl ketone, 2,2-dimethoxy-2-phenylacetophenone, xanthone, fluorenone, benzaldehyde, fluorene, anthraquinone, ethylanthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzil dimethylketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholino-propane-1-one, 2,4,6-trimethyl benzoyl diphenyl phosphine oxide, and bis-(2,6-dimethoxy benzoyl)-2,4,4-trimethylpentyl phosphine oxide. They may be used singly or in combination. These photopolymerization initiators may be used alone, or two or more kinds may be used in combination.

In addition, examples of commercial products that may be used as the photopolymerization initiator include IRGA-CUREs 184, 369, 651, 500, 907, CGI1700, CGI1750, CGI1850, and CG24-61; DAROCUREs 1116 and 1173; LucirinTPO (all manufactured by BASF); and EBECRYL P36 (manufactured by UCB).

While it is essential to mix the above-described ingredients of the photocurable material at ambient temperatures or under heating conditions, and the method is not specifically limited, it is preferable to use a method of sufficiently agitating or kneading the above-described ingredients at an appropriate temperature using an agitation equipment such as a mixer under reduced pressure or under an inert gas atmosphere using nitrogen or the like, and then dissolving or uniformly dispersing the mixture.

Additives other than the above-described ingredients may be added to the photocurable material as necessary. Examples of the above-described additives include a stabilizer, a softener, a pigment, a dye, an antistatic agent, a flame retardant, a sensitizer, a dispersant, a solvent, and an antibacterial and antifungal agent. The additives may be used in combination appropriately.

The photocurable material according to the present invention can be cured by being polymerized with light such as ultraviolet light. The photocurable material can be used for an adhesive material, a coating material, a sealing material, and a molding material for car parts, parts for electric/electronic appliance, and aircraft parts.

The ultraviolet irradiation conditions for curing a curable material with ultraviolet light to obtain cured products can be selected appropriately according to the composition or the like of the curable material. A known irradiation device can be used for ultraviolet irradiation. Examples of the irradiation device include light sources such as a bulb-type UV lamp in which Hg, Hg/Xe, a metal halide compound, or the like is contained, and a LED-UV lamp. In addition, a condensation-type UV irradiation device arranged to condense light from the above-described light source with the use of a reflection mirror to perform irradiation may be used as the ultraviolet irradiation device.

EXAMPLES

Hereinafter, a specific description of the present invention will now be provided with reference to Examples; however, the present invention is not limited to the Examples. Table 1 and Table 2 show Preparation Examples and Examples of photocurable materials. Table 3 shows Preparation Examples and Comparative Examples of photocurable materials. The ingredients of the content ratios (in part by mass) shown in Tables 1 to 3 were mixed to be dissolved or dispersed with the use of an agitation equipment. Thus, the photocurable materials shown in the tables were prepared.

Abbreviations described below are used in Tables 1 to 3. Reagents with no specific indication of manufacturer are reagent-grade products manufactured by TOKYO CHEMICAL INDUSTRY CO., LTD.
[(Meth)Acrylates]
  IBA: isobornyl acrylate
  DPGA: dipropylene glycol diacrylate
  HPGA: heptapropylene glycol diacrylate
[Chain Transfer Agents]
  UP-1 (Synthesis Example 1)
  UP-2 (Synthesis Example 2)
  UP-3 (Synthesis Example 3)
  UP-4 (Synthesis Example 4)
  UP-5 (Synthesis Example 5)
  UP-6 (Synthesis Example 6)
  UP-7 (Synthesis Example 7)
  UP-8 (Synthesis Example 8)
[Photo (Ultraviolet) Polymerization Initiators]
  HCHPK: 1-hydroxycyclohexyl phenyl ketone
[Metal-Containing Compound]
  BPDZ: bis(2,4-pentanedionato)zinc(II)
[Silicone Resin]
  SE: Commercially available humidity-curable resin SE-9186 (manuf.: DOW CORNING TORAY CO., LTD.)

(Synthesis Example 1) Synthesis of UP-1

80 g (200 mmol) of polypropylene glycol with a number average molecular weight of 400, 40 g (238 mmol) of hexamethylene diisocyanate, and 0.05 g of dibutyltin dilaurate were prepared in a reaction vessel having an agitation equipment. While the mixture was agitated, the liquid temperature was raised from room temperature to 50° C. for one hour. Then, a sampling of the mixture was taken in a small amount to measure FT-IR. While absorption of the isocyanate in the vicinity of 2300 $cm^{-1}$ was being checked, the mixture was continued to agitate at 50° C. The time when the amount of the residual isocyanate groups became only terminals of the polyurethane and judged to stay unchanged based on an absorption area of FT-IR was regarded as reaction completion, and thus a colorless transparent viscous liquid was obtained. Further, 17.1 g (77.2 mmol) of 3-aminopropyltriethoxysilane was added to the obtained liquid. While the mixture was agitated, the liquid temperature was raised from room temperature to 50° C. for one hour. Then, a sampling of the mixture was taken in a small amount to measure FT-IR. The time when absorption of the isocyanate in the vicinity of 2300 $cm^{-1}$ disappeared was regarded as reaction completion, and thus a colorless transparent viscous liquid was obtained. This liquid is defined as UP-1. UP-1 defines liquid polyurethane into which triethoxysilyl groups are introduced at both the terminals.

(Synthesis Example 2) Synthesis of UP-2

21.3 g (20.6 mmol) of modified polytetramethylene glycol with a number average molecular weight of 1034, 5.5 g (24.7 mmol) of isophorone diisocyanate, and 0.05 g of dibutyltin dilaurate were prepared in a reaction vessel having an agitation equipment. While the mixture was agitated, the liquid temperature was raised from room temperature to 50° C. for one hour. Then, a sampling of the mixture was taken in a small amount to measure FT-IR. While absorption of the isocyanate in the vicinity of 2300 $cm^{-1}$ was being checked, the mixture was continued to agitate at 50° C. The time when the amount of the residual isocyanate groups became only terminals of the polyurethane and judged to stay unchanged based on an absorption area of FT-IR was regarded as reaction completion, and thus a colorless transparent viscous liquid was obtained. Further, 1.84 g (8.3 mmol) of 3-aminopropyltriethoxysilane was added to the obtained liquid. While the mixture was agitated, the liquid temperature was raised from room temperature to 50° C. for one hour. Then, a sampling of the mixture was taken in a small amount to measure FT-IR. The time when absorption of the isocyanate in the vicinity of 2300 $cm^{-1}$ disappeared was regarded as reaction completion, and thus a colorless transparent viscous liquid was obtained. This liquid is defined as UP-2. UP-2 defines liquid polyurethane into which triethoxysilyl groups are introduced at both the terminals.

(Synthesis Example 3) Synthesis of UP-3

A reaction was performed in a similar manner to Synthesis Example 2 except that 0.92 g (4.15 mmol) of 3-aminopropyltriethoxysilane and 0.54 g (4.15 mmol) of hydroxypropyl acrylate were added instead of 1.84 g of 3-aminopropyltriethoxysilane, and thus a colorless transparent viscous liquid was obtained. This liquid is defined as UP-3. UP-3 defines liquid polyurethane into which a triethoxysilyl group is introduced at one terminal while an acrylate group is introduced at the other terminal.

(Synthesis Example 4) Synthesis of UP-4

20 g (9 mmol) of terminal diol hydrogenated polybutadiene with a number average molecular weight of 2222, 4 g (18 mmol) of isophorone diisocyanate, and 0.05 g of dibutyltin dilaurate were prepared in a reaction vessel having an agitation equipment. While the mixture was agitated, the liquid temperature was raised from room temperature to 50° C. for one hour. Then, a sampling of the mixture was taken in a small amount to measure FT-IR. While absorption of the isocyanate in the vicinity of 2300 $cm^{-1}$ was being checked, the mixture was continued to agitate at 50° C. The time when the amount of the residual isocyanate groups, became only terminals of the polyurethane and judged to stay unchanged based on an absorption area of FT-IR was regarded as reaction completion, and thus a colorless transparent viscous liquid was obtained. Further, 4 g (18.1 mmol) of 3-aminopropyltriethoxysilane was added to the obtained liquid. While the mixture was agitated, the liquid temperature was raised from room temperature to 50° C. for one hour. Then, a sampling of the mixture was taken in a small amount to measure FT-IR. The time when absorption of the isocyanate in the vicinity of 2300 $cm^{-1}$ disappeared was regarded as reaction completion, and thus a colorless transparent viscous liquid was obtained. This liquid is defined as UP-4. UP-4 defines liquid polyurethane into which triethoxysilyl groups are introduced at both the terminals.

(Synthesis Example 5) Synthesis of UP-5

A reaction was performed in a similar manner to Synthesis Example 4 except that 2 g (9.1 mmol) of 3-aminopropyltriethoxysilane and 1.17 g (9.00 mmol) of hydroxypropyl acrylate were added instead of 4 g of 3-aminopropyltriethoxysilane of Synthesis Example 4, and thus a colorless transparent viscous liquid was obtained. This liquid is defined as UP-5. UP-5 defines liquid polyurethane into which a triethoxysilyl group is introduced at one terminal while an acrylate group is introduced at the other terminal.

(Synthesis Example 6) Synthesis of UP-6

A reaction was performed in a similar manner to Synthesis Example 4 except that 3.23 g (18.0 mmol) of 3-aminopropyltrimethoxysilane was added instead of 4 g of 3-aminopropyltriethoxysilane of Synthesis Example 4, and thus a colorless transparent viscous liquid was obtained. This liquid is defined as UP-6. UP-6 defines liquid polyurethane into which trimethoxysilyl groups are introduced at both the terminals.

(Synthesis Example 7) Synthesis of UP-7

A reaction was performed in a similar manner to Synthesis Example 2 except that 1.08 g (8.3 mmol) of hydroxypropyl acrylate was added instead of 1.84 g of 3-aminopropyltriethoxysilane of Synthesis Example 2, and thus a colorless transparent viscous liquid was obtained. This liquid is defined as UP-7. UP-7 defines liquid polyurethane into which acrylate groups are introduced at both the terminals while having no alkoxysilyl group.

(Synthesis Example 8) Synthesis of UP-8

A reaction was performed in a similar manner to Synthesis Example 4 except that 2.35 g (18.1 mmol) hydroxypropyl acrylate was added instead of 4 g of 3-aminopropyltriethoxysilane of Synthesis Example 4, and thus a colorless transparent viscous liquid was obtained. This liquid is defined as UP-8. UP-8 defines liquid polyurethane into which acrylate groups are introduced at both the terminals while having no alkoxysilyl group.

[Evaluation Method for Dark Portion Curing Rate]

As shown in FIG. 1, each of compositions 1 shown in Tables 1 to 3 was put in a hard fluororesin tube 2 having an inner diameter of 10 mm that has a fluororesin stopper filling the opening at the bottom of the tube such that the liquid level of each composition 1 was set 50 mm high. The upper portion of 30 mm of each composition 1 was light shielded with an aluminum foil 3 while the lower portion of 20 mm was left unshielded. Then, each composition 1 was irradiated with ultraviolet light for two seconds on the side surface with the use of a UV lamp 4 (100 mW/cm$^2$, manufactured by SEN LIGHTS CO., LTD.). Then, each composition 1 was left at room temperature under a light-shielded condition for ten minutes. A glass rod having a diameter of 1.5 mm was inserted from the upper portion of each composition 1 to check the cured portion, and thus the length of the cured portion that proceeded from a border B between an ultraviolet light irradiation surface and a light shielded surface to the upper portion (unirradiated portion) was measured. Note that whether each composition 1 was cured or not was judged with finger touch based on whether the rod could be inserted or not. Then, each composition 1 was left at room temperature under a light-shielded condition for more three hours, and the length of the cured portion was measured in a similar manner. The measured values were determined as the lengths of the cured portions (mm), shown in Tables 1 to 3, and used as indicators of curability. To be specific, a longer length of the cured portion indicates higher dark portion curability.

[Evaluation Results]

The compositions according to Comparative Examples 1 to 4, which did not contain a chain transfer agent, show that dark portion curing did not proceed both after 10 minutes and after three hours of photocuring. The composition according to Comparative Example 5, which used a commercially available humidity-curable silicone resin, shows that photocuring did not occur and had no portion sufficiently cured after having been left even for about three hours. This curing reaction can be called as a kind of anion curing; however, this curing reaction is humidity curing depending only on humidity in the air, which means it takes time for the composition to be cured. The compositions according to Comparative Examples 6 to 7, which contained a chain transfer agent, showed that dark portion curing proceeded by irradiation of light. However, the chain transfer agent, which has no alkoxysilyl group that anion-cures while having radical curability, showed that the length of the cured dark portion after three hours was same as the length after 10 hours, which means that no curing occurred. Meanwhile, in the compositions according to the present Examples 1 to 16, dark portions were cured 10 minutes after irradiation of light, and the lengths of the cured portions were obviously further longer after three hours. This result showed that anion curing occurred as a later curing reaction in addition to the conventional dark portion curing that occurred in a chain reaction. In the present Examples, curing of dark portions that light could not reach only in a chain photo-radical reaction could be complemented by the later anion curing. This result supports that the photocurable material according to the present invention makes it possible that a portion that light is harder to reach is cured by irradiation of light.

TABLE 1

| | | Preparation Examples, Examples | | | | | | | |
|---|---|---|---|---|---|---|---|---|---|
| | | 1 | 2 | 3 | 4 | 5 | 6 | 7 | 8 |
| (Meth)acrylate | IBA | 50 | 50 | 50 | 50 | 50 | 50 | 50 | 60 |
| | DPGA | 10 | | | | | | | |
| | HPGA | | 10 | 10 | 10 | 10 | 10 | 10 | |
| Chain transfer agent | UP-1 | 40 | 40 | | | | | | |
| | UP-2 | | | 40 | | | | | |

TABLE 1-continued

|  |  | Preparation Examples, Examples | | | | | | | |
|---|---|---|---|---|---|---|---|---|---|
|  |  | 1 | 2 | 3 | 4 | 5 | 6 | 7 | 8 |
|  | UP-3 |  |  |  | 40 |  |  |  |  |
|  | UP-4 |  |  |  |  | 40 |  |  | 40 |
|  | UP-5 |  |  |  |  |  | 40 |  |  |
|  | UP-6 |  |  |  |  |  |  | 40 |  |
| Photo polymerization initiator | HCHPK | 1 | 1 | 1 | 1 | 1 | 1 | 1 | 1 |
| Metal-containing compound | BPDZ | 0.5 | 0.5 | 0.5 | 0.5 | 0.5 | 0.5 | 0.5 | 0.5 |
| Cured portion Length (mm) | After 10 min. | 5.5 | 5.4 | 5.5 | 5.8 | 5.5 | 5.7 | 5.6 | 4.8 |
|  | After 3 H | 12.1 | 13.1 | 12.0 | 10.1 | 13.5 | 10.3 | 11.2 | 12.2 |

TABLE 2

|  |  | Preparation Examples, Examples | | | | | | | |
|---|---|---|---|---|---|---|---|---|---|
|  |  | 9 | 10 | 11 | 12 | 13 | 14 | 15 | 16 |
| (Meth)acrylate | IBA |  |  | 80 | 82 |  |  | 50 | 50 |
|  | DPGA | 60 |  |  |  |  |  |  |  |
|  | HPGA |  | 60 | 10 | 10 | 10 | 7 | 10 | 10 |
| Chain transfer agent | UP-1 |  |  |  |  |  |  |  |  |
|  | UP-2 |  |  |  |  |  |  |  |  |
|  | UP-3 |  |  |  |  |  |  |  |  |
|  | UP-4 | 40 | 40 | 10 | 8 | 90 | 93 | 40 | 40 |
|  | UP-5 |  |  |  |  |  |  |  |  |
|  | UP-6 |  |  |  |  |  |  |  |  |
| Photo polymerization initiator | HCHPK | 1 | 1 | 1 | 1 | 1 | 1 | 1 | 1 |
| Metal-containing compound | BPDZ | 0.5 | 0.5 | 0.5 | 0.5 | 0.5 | 0.5 |  | 20 |
| Cured portion Length (mm) | After 10 min. | 6.2 | 6.0 | 5.1 | 4.9 | 4.6 | 4.5 | 5.0 | 4.8 |
|  | After 3 H | 13.1 | 13.0 | 10.3 | 10.1 | 13.7 | 13.7 | 13.1 | 13.6 |

TABLE 3

|  |  | Preparation Examples, Comparative Examples | | | | | | |
|---|---|---|---|---|---|---|---|---|
|  |  | 1 | 2 | 3 | 4 | 5 | 6 | 7 |
| (Meth)acrylate | IBA | 100 |  |  | 90 |  | 50 | 50 |
|  | DPGA |  | 100 |  |  |  |  |  |
|  | HPGA |  |  | 100 | 10 |  | 10 | 10 |
| Chain transfer agent | UP-7 |  |  |  |  |  | 40 |  |
|  | UP-8 |  |  |  |  |  |  | 40 |
| Silicone resin | SE |  |  |  |  | 100 |  |  |
| Photo polymerization initiator | HCHPK | 1 | 1 | 1 | 1 |  | 1 | 1 |
| Metal-containing compound | BPDZ | 0.5 | 0.5 | 0.5 | 0.5 |  | 0.5 | 0.5 |
| Cured portion Length (mm) | After 10 min. | 0.5> | 0.5> | 0.5> | 0.5> | 0.5> | 5.1 | 5.4 |
|  | After 3 H | 0.5> | 0.5> | 0.5> | 0.5> | 0.5> Half gelled | 5.1 | 5.4 |

[Humidity Dependency of Dark Portion Curing]

Humidity dependency of dark portion curing was evaluated in order to check that dark portion curing in the photocurable material according to the present invention occurred not because alkoxysilyl groups were hydrolyzed to humidity-cure a dark portion but because hydroxy anion related to the radical polymerization. Table 4 shows Examples and Comparative Examples relating to humidity dependency of dark portion curing. The evaluation method is as follows.

Each of the ingredients according to Examples 17 and 18, and Comparative Examples 8 to 10 having the compositions (part by mass) shown in Table 4 was mixed with the use of an agitation equipment to be dissolved or dispersed, and thus photocurable materials shown in Table 4 were obtained. Evaluation for dark portion curability was performed by putting the photocurable materials having the compositions shown in Table 4 in the above-described device shown in FIG. 1, and light shielding and irradiation of ultraviolet light were made in a similar manner as above. Two curing samples were made for each photocurable material. One of the curing samples was left at 23° C. at a humidity of 20% under a light-shielded condition for ten hours while the other one was left at 23° C. at a humidity of 85% under a light-shielded condition for ten hours. Then, a glass rod having a diameter of 1.5 mm was inserted from the upper portion of each material to check the cured portion, and thus the length of the cured portion that proceeded from a border B between an ultraviolet light irradiation surface and a light shielded surface to the upper portion (unirradiated portion) was measured. Note that whether each material was cured or not was judged with finger touch based on whether the rod could be inserted or not. The measured values were determined as the lengths of the cured portions (mm), shown in Table 4, and used as indicators of curability.

[Evaluation Results of Humidity Dependency of Dark Portion Curing]

As shown in Table 4, because curing proceeded only by humidity curing reaction in the commercially available humidity-curable silicone resin according to Comparative Example 8, the length of the cured portion at a humidity of 85% was 30 mm or more, which was long, while the length of the cured portion at a humidity of 20% was 3.1 mm, which was short, and thus it is shown that the curing reaction was slow at a low humidity. In addition, the materials according to Comparative Examples 9 and 10, which contained a chain transfer agent, showed that photocuring and dark portion curing proceeded to some extent. However, because the contained chain transfer agents had no alkoxysilyl group having humidity curability, the curing reaction did not depend on humidity, and curing did not proceed even at a humidity of 85%.

Meanwhile, in the present inventions according to Examples 17 and 18, the lengths of the cured portions both at a humidity of 20% and at a humidity of 85% were 30 mm or more. The results of Examples 17 and 18 showed that dark portion curing after irradiation of light proceeded irrespective of humidity. This result showed that anion curing occurred as a later curing reaction aside from humidity curing in the present invention, which proves that the present invention has the function as a curable material combining radical curability and anionic curability.

TABLE 4

|  |  | Preparation Examples, Examples | | Preparation Examples, Comparative Examples | | |
|---|---|---|---|---|---|---|
|  |  | 17 | 18 | 8 | 9 | 10 |
| (Meth)acrylate | IBA | 50 | 50 |  | 50 | 50 |
|  | HPGA | 10 | 10 |  | 10 | 10 |
| Chain transfer agent | UP-2 | 40 |  |  |  |  |
|  | UP-4 |  | 40 |  |  |  |
|  | UP-7 |  |  |  | 40 |  |
|  | UP-8 |  |  |  |  | 40 |
| Silicone resin | SE |  |  | 100 |  |  |
| Photo polymerization initiator | HCHPK | 1 | 1 |  | 1 | 1 |
| Metal-containing compound | BPDZ | 0.5 | 0.5 |  | 0.5 | 0.5 |
| Cured portion Length at a humidity of 20% after 10 H |  | >30.0 | >30.0 | 3.1 | 5.2 | 5.5 |
| Cured portion Length at a humidity of 85% after 10 H |  | >30.0 | >30.0 | >30.0 | 5.2 | 5.6 |

The foregoing description of the preferred embodiments of the present invention has been presented for purposes of illustration and description; however, it is not intended to be exhaustive or to limit the present invention to the precise form disclosed, and modifications and variations are possible as long as they do not deviate from the principles of the present invention.

The invention claimed is:

1. A photocurable material that comprises a photocurable liquid composition curable by irradiation of light, the material comprising:
   (meth)acrylate; and
   a chain transfer agent;
wherein the chain transfer agent is represented by the following chemical formula:

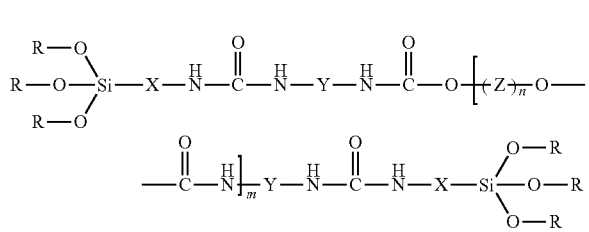

R represents an alkyl group; X represents a divalent hydrocarbon group; Y represents a linear divalent hydrocarbon group, a saturated cyclic divalent hydrocarbon group, or an unsaturated cyclic divalent hydrocarbon group; Z represents a repeating unit of a dial component; n is 5 to 100; and m is 2 to 100.

2. The photocurable material according to claim 1, further comprising a metal-containing compound.

3. The photocurable material according to claim 2, wherein the content of the chain transfer agent is within the range of 10 to 90 mass % of the total photocurable material.

4. The photocurable material according to claim 3, wherein the metal-containing compound comprises any one metal compound selected from the group consisting of tin, copper, zinc, cobalt, and nickel.

5. The photocurable material according to claim 2, wherein the metal-containing compound comprises any one metal compound selected from the group consisting of tin, copper, zinc, cobalt, and nickel.

6. The photocurable material according to claim 1, wherein the content of the chain transfer agent is within the range of 10 to 90 mass % of the total photocurable material.

7. The photocurable material according to claim 2, wherein the metal-containing compound comprises any one metal compound selected from the group consisting of copper, zinc, cobalt, and nickel.

8. A method for curing the photocurable material according to claim 1, which method is carried out by anion curing in which a polyalcohol having a hydroxyl group is generated as a by-product in a radical curing reaction, and an ester exchange reaction occurs between the alkoxysilyl groups of the chain transfer agent and the polyalcohol before the alkoxysilyl groups react with moisture in air.

* * * * *